United States Patent [19]

Hudson

[11] Patent Number: 4,525,512

[45] Date of Patent: Jun. 25, 1985

[54] COALESCING AGENTS

[75] Inventor: Barry Hudson, Beverley, England

[73] Assignee: BP Chemicals Limited, London, England

[21] Appl. No.: 583,323

[22] Filed: Feb. 24, 1984

[30] Foreign Application Priority Data

Mar. 9, 1983 [GB] United Kingdom ............... 8306530

[51] Int. Cl.$^3$ ........................... C08K 5/09; C08K 5/10
[52] U.S. Cl. ................................... 524/284; 560/263; 523/335
[58] Field of Search ....................... 524/284; 560/263; 523/335

[56] References Cited

PUBLICATIONS

*Journal of Paint Technology*, vol. 47, No. 610, Nov. 1975, pp. 60–67, Sullivan, D. A., "Water and Solvent Evaporation from Latex & Latex Paint Films".

*Primary Examiner*—John Kight
*Assistant Examiner*—Marvin L. Moore
*Attorney, Agent, or Firm*—Brooks, Haidt, Haffner & Delahunty

[57] ABSTRACT

This invention relates to esters of alkyl diglycol ethers with mono- and dicarboxylic acids and the use thereof as coalescing agents in polymer latices employed in paint formulations. A particularly preferred ester is ethyldiglycol propionate. The esters claimed are effective in lowering the minimum film forming temperature of various emulsion polymers, are stable in the presence of water and are compatible with pigments and fillers normally used in paint formulations.

20 Claims, No Drawings

COALESCING AGENTS

The present invention relates to esters of alkyl diglycol ethers with mono- and dicarboxylic acids and the use thereof as coalescing agents in polymer latices employed in paint formulations.

Almost all polymer latices used commercially are required to form strong, coherent and adherent films when they are applied to a substrate surface and allowed to dry. Normally during storage and application, the polymer particles in the latex must have freedom of movement in order to maintain stability of the latex, to promote binding power and to facilitate application. After application, however, the polymer particles must fuse into a continuous film. This is particularly important in the case of polymer latices used in paint formulations.

Paint formulations, therefore, contain in addition to the polymer latex, pigments and fillers, a film forming aid usually called a "coalescing agent." The function of the coalescing agent is not only to act as a solvent but also to act as a temporary plasticizer for the polymer in the latex, to soften the polymer and to lower the glass transition temperature thereby aiding and improving the formation of a continuous film. Moreover, the coalescing agent should be volatile enough to escape when the applied paint is allowed to dry but should evaporate more slowly than the other ingredients such as glycol antifreezes or drying retarders in the paint formulations so as to remain in the film until after these non-solvents which delay film coalescence have evaporated. The coalescing agents should be stable in the presence of water and should be compatible with the other ingredients in the formulations such as pigments and fillers and most importantly with the polymer latex without adversely affecting the colloidal stability of the latex. Factors such as volatility, odour, toxicity, compatibility with aqueous systems and raw material cost have also to be considered. In general, a selection of volatile organic solvents have been widely used as coalescing agents. Examples of the more commonly used solvents are:

Diethylene glycol mono-ethyl ether (CARBITOL*)
Diethylene glycol mono-butyl ether (Butyl CARBITOL*)
Diethylene glycol mono-ethyl ether acetate (CARBITOL* Acetate)
Hexylene glycol
Butoxyethyoxypropanol (BEP)
n-Propoxypropanol (PROPASOL* P)
n-Butoxypropanol (PROPASOL* B)
Ethylene glycol monobutyl ether acetate (Butyl CELLOSOLVE* Acetate)
Diethylene glycol monobutyl ether acetate (Butyl CARBITOL* Acetate)
Phenyl glycol ether
Trimethylpentanediol isobutyrate (Texanol*)
* Registered Trade Mark The choice of a specific coalescing agent for a particular latex will depend upon the nature of the latex and the desired use of the latex. An important consideration is to determine whether the coalescing agent is more likely to be in the aqueous or the polymer phase of the latex. Some of the coalescing agents are completely miscible with water in all proportions whilst others have limited miscibility. Usually the more polar agents are miscible with water.

The object of the present invention is to produce a novel series of esters which can be used as coalescing agents by virtue of their desirable characteristics with respect to solvent power, water miscibility, volatility, odour and cost without substantially impairing any other desired properties in such an agent.

Accordingly, the present invention is an ester of the general formula $$XR$$

wherein X represents the group

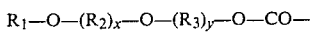

$$R_1-O-(R_2)_x-O-(R_3)_y-O-CO-$$

in which $R_1$ is a $C_1$–$C_4$ alkyl group, each of $R_2$ and $R_3$ represent the same or different straight or branched chain alkylene group, and each of x and y represent an integer from 2 to 4, and R is selected from an ethyl group, a propyl group, X, and $-C_nH_{2n}X$ wherein n is an integer between 1 and 8, and in each of which X has the same notation as above.

Thus the ester may be derived from an alkyl diglycol ether and a carboxylic acid. The carboxylic acid used to produce the ester may be selected from one or more of an aliphatic, alicyclic and an aromatic mono- or dicarboxylic acid and functionally substituted derivatives thereof.

Specific examples of such esters include both the monoesters, such as the propionates, n-butyrates and iso-butyrates, and the diesters such as the oxalates, malonates and succinates of (1) Diethylene glycol-monomethylether, diethylene glycol-monoethylether, diethylene glycol-mono n-propylether, diethylene glycol-mono-iso-propyl ether, diethylene glycol-mono n-butylether, diethylene glycol-mono-iso-butyl ether and diethylene glycol-mono-tertiary butylether;

(2) Dipropylene glycol-monomethyl ether, dipropylene glycol-monoethylether, dipropylene glycol-mono n-propylether, dipropylene glycol-mono-iso-propyl ether, dipropylene glycol-mono n-butyl ether, dipropylene glycol-mono-iso-butyl ether and dipropylene glycol-mono-tertiary butyl ether;

(3) Dibutylene glycol-monomethyl ether, dibutylene glycol-monoethylether, dibutylene glycol-mono n-propylether, dibutylene glycol-mono-iso-propyl ether, dibutylene glycol-mono n-butyl ether, dibutylene glycol-mono-iso-butyl ether and dibutylene glycol-mono-tertiary butyl ether; and (4) Butoxyethoxy propanol Both the mono- and the diesters of the present invention may be prepared by any conventional esterification process e.g. by reacting the appropriate diglycol ether with an excess of the appropriate acid. To facilitate the reaction a conventional esterification catalyst, e.g. para-toluene sulphonic acid may be used. The reaction may, if desired, be carried out in the presence of an entrainer. The esters may thereafter be recovered by standard distillation or residue ester recovery techniques.

The esterification reaction may be carried out using any of the following combination of mixtures: (a) a single acid and a single diglycol ether, (b) a single acid and a mixture of diglycol ethers, (c) a mixture of acids and a single diglycol ether and (d) a mixture of acids and a mixture of diglycol ethers. The resultant product in the case of a mixture of reactants being used will contain in addition to the symmetrical (di)esters a mixture of unsymmetrical esters.

The esters of the present invention are particularly suitable for use as coalescing agents.

The actual amount of coalescing agent that is needed in a polymer latex will depend upon the nature of the polymer (especially its glass transition and minimum film forming temperatures, and hardness), the amount of pigment and filler in the formulation and the end use of the latex. It is suitably from 0.5 to 10% by weight in the emulsion, preferably from 1 to 6% by weight in the emulsion. The higher concentrations in this range are most suitable for exterior applications.

The present invention is further illustrated with reference to the following Examples.

Preparation of Ethyldiglycol Propionate(EDGP)

The propionate ester of ethyl diglycol ether was prepared using a standard esterification technique, reacting an excess of ethyl diglycol ether with propionic acid using para-toluene sulphonic acid (PTSA) as the catalyst and cyclohexane as entrainer.

A typical charge to produce ca. 5 liters of EDGP (more than 98% pure) is as follows:

| | |
|---|---|
| Ethyl diglycol ether | 5046 g (5% excess) |
| Propionic acid | 2603 g |
| Cyclohexane | 520 g |
| PTSA | 75 g (1%) |

The esterification was carried out in a 10 liter kettle fitted with a 20 plate, 2 inch diameter Oldershaw column with a Dean and Stark head to remove water produced in the reaction. Esterification was continued until the propionic acid was consumed.

The product was distilled at reduced pressure using a 20 plate, 2 inch Oldershaw column. Ethyl diglycol propionate distilled over between 140°–142° C. at 50 mmHg.

Evaluation of Ethyldiglycol Propionate (EDGP) as Coalescing Solvent

The study of the effectiveness and efficiency of the ethyldiglycol propionate (EDGP) as a coalescing aid in latex formulations was conducted by comparison with the performance of commercial coalescing aids. These coalescing aids were evaluated with a few emulsions polymers. The suppliers of these materials and some typical properties of them are shown in Table 5 below. For each possible combination of coalescing aids and polymer, the following properties were evaluated:
   minimum film forming temperature (MFFT)
   scrub resistance.

Minimum Film Forming Temperature (MFFT)

In this test, the coalescing aids were added to commercial emulsions in several concentrations. Each blend was then applied to an aluminium temperature gradient platform. Thermometers were attached to the platform in order to measure the temperature gradient from end to end. The total plate was enclosed in a plastic box through which dry nitrogen was passed to avoid water condensation.

On drying, a clear film was formed at the warmer end, and a white, cloudy or frosty film at the colder end. The point of transition was noted and reported as the minimum film-forming temperature.

The following coalescing aids were evaluated in the following different polymers:
   Ethyldiglycol propionate (EDGP, ex BP Chemicals)
   Cofenex* P (ex Rhone-Poulenc): n-Propyl-alkane dioate $$CH_3-CH_2-CH_2-O-CO(CH_2)_n-CO-CH_2-CH_2-CH_3$$

$$n = 2, 3, 4$$

Texanol* (ex Eastman Chem Produit)
   2,2,4-Trimethyl-1,3 pentanediolmonoisobutyrate $$HO.CH_2.C(CH_3)_2-CH_2[O.CO.CH(CH_3)_2]-CH(CH_3)_2$$

Dalpad* A. (ex Dow)
   Phenolic ether of monoethylene glycol
Cofenex* IB (ex Rhone-Poulenc):
   Isobutyl alkane dioate
*Regd. Trade Mark The results are shown in Table 1 below.

Similar results on the effects of coalescing aid on minimum film formation temperature (at 3% by wt on emulsion polymers) are shown in Table 2 below.

In Table 1 only results relating to EDGP illustrate the invention, the others being comparative tests.

TABLE 1

Minimum Film Forming Temperatures of Emulsion (°C.) Versus Coalescing Aid Concentration

| | Coalescing Aid % by wt | | | | | | | | |
|---|---|---|---|---|---|---|---|---|---|
| | | EDGP | | | Cofenex* P | | | Texanol* | |
| Emulsions | None | 1.5 | 3 | 6 | 1.5 | 3 | 6 | 1.5 | 3 | 6 |
| MOWILITH* DM 611 | 16 | 9 | −1 | −2 | 9 | 1 | −2 | 12 | 4 | 2 |
| SYNRESYL* CO 50 | 10 | 1 | −1 | −1 | 3 | −1 | −1 | 5 | −0.5 | −2 |
| VINAMUL* 3405 | 12 | 2 | −2.5 | −4 | 3 | −1 | −1 | 6 | −1 | −1 |
| RHODOPAS* DS 910 | 16 | 4.5 | −1 | −2.5 | −1 | −2 | −2 | 7 | 1 | −1 |

*Regd. Trade Mark

TABLE 2

In Table 2 only results relating to EDGP illustrate the invention the others being comparative tests
Effects of coalescing aid on minimum film forming temperature

| | Coalescing Aid 3% by wt | | | | | | |
|---|---|---|---|---|---|---|---|
| Emulsions | None | Texanol* | Dalpad* A | Cofenex* P | Cofenex* IB | Butyl-glycol | EDGP |
| Styrene/ester acrylic | | | | | | | |
| Mowilith* DM 611 | 16 | 4 | 4 | 0 to 1 | 3 | 6 | −1 |

TABLE 2-continued

In Table 2 only results relating to EDGP illustrate
the invention the others being comparative tests
Effects of coalescing aid on minimum film forming temperature

| | Coalescing Aid 3% by wt | | | | | | |
|---|---|---|---|---|---|---|---|
| Emulsions | None | Texanol* | Dalpad* A | Cofenex* P | Cofenex* IB | Butyl-glycol | EDGP |
| Rhodopas* DS 910 | 16 | 1 | 0 | −2 | −1 | 0 | −1 |
| Acronal* 290 D | 20 | 0 | 0 | −1 | 0 | 7 | −1 |
| Acetate/Versatate | | | | | | | |
| Synresyl* CO 50 | 10 | 0.5 | −1 | −1 | 0 | −1 | −1 |
| Vinamul* 6980 | 10 | −1 | | 1 | 6 | | −1 |
| Rhodopas* DEA 818 | 16 | −3 | 9 | −1 | 1 | 3 | −2,5 |
| Vinylacetate/VC/ethylene | | | | | | | |
| Vinamul* 3405 | 12 | −1 | | −1 | 0 | | −2,5 |

*Regd. Trade Mark

The results in Tables 1 and 2 above show that ethyldiglycol propionate is efficient in lowering the minimum film forming temperature of various emulsion polymers.

EDGP appears at least equivalent, and in most cases, superior, to all the other coalescing aids evaluated.

Scrub Resistance

By the scrub resistance test, the ability of a latex paint to resist detergent washing of the paint film is ascertained. The test was run on Erichsen model 494 Tester (DIN 53 778 p.2 ans ASTM D 2486). Paints to be tested were applied to special black Leneta Scrub test panels and allowed to dry at 23° C. for one week. The paint surface was scrubbed with 0.25% sodium dodecylbenzene sulfonate-water mixture, using a brush moving back and forth in a straight line. After 5000 cycles the extent to which the black substrate became visible was observed.

The results have been interpreted on a comparison basis.

The scrub resistances of latex paints containing different coalescing aids (including EDGP) are shown in Table 4 below:

The standard formulation of pigmented latex paint used to evaluate the effect of EDGP on scrub resistance is shown in Table 3.

TABLE 3

Standard formulation of pigmented latex paint for evaluation of scrub resistance

| GRIND | % WT | FUNCTION | MANUFAC-TURER |
|---|---|---|---|
| Water | 25.5 | Volatile vehicle | |
| Sodium Hexameta-phosphate | 0.10 | (moistening agent) | |
| Coatex* P 90 | 0.35 | Pigment dispersing aid | Coatex |
| Natrosol* 250 HR | 0.37 | Thickener | Hercules |
| Nopco* 8034 | 0.20 | Defoamer | Diamond Shamrock |
| TiO₂ RL 75 | 7 | Pigment | Thann et Mulhouse |
| Talc O | 3 | Extender pigment | Luzenac |

TABLE 3-continued

Standard formulation of pigmented latex paint for evaluation of scrub resistance

| GRIND | % WT | FUNCTION | MANUFAC-TURER |
|---|---|---|---|
| Omya* BLP₂ | 20 | Extender pigment | Omya |
| Durcal* 2 | 30 | Extender pigment | Omya |

*Regd. Trade Mark

After preparation of Grind the latex was incorporated to prepare paint formulations of the following composition:
  Grind: 83.5%
  Latex Emulsion: 16%
  Coalescing agent: 0.5%

In Table 4 only results relating to EDGP illustrate the invention, the others being comparative tests.

TABLE 4

| Coalescing Aid Latex | Texanol* | Cofenex* P | EDGP |
|---|---|---|---|
| Mowilith* DM611 | 2 | 1 | 1.5 |
| Acronal* 290 D | 1 | 1 | 1 |
| Synresyl* CO 50 | 3 | 3 | 3 |

| Rating | Scrub resistance | Comment |
|---|---|---|
| 1 | Excellent | No wear |
| 2 | Fair | Worn film removed |
| 3 | Poor | Film removed |

*Regd. Trade Mark

As indicated in Table 4, EDGP shows good scrubbability, and is comparable with the other coalescing aids currently used in the paint industry.

TABLE 5

| | Latex | | | | | |
|---|---|---|---|---|---|---|
| Latex | Mowilith* DM 611 | Rhodopas* DS 910 | Acronal* 290 D | Synresyl* Co 50 | Rhodopas* DEA 818 | Vinamul* 3405 |
| Origin | Hoechst | Rhone-Poulenc | BASF | Synres | Rhone-Poulenc | Sheby |
| Nature | Styrene/Acrylate | Styrene-Acrylate | Styrene/Acrylate | Acetate/Versatate | Acetate/Versatate | VA/VC/ethylene |
| MFFT °C. | 16 | 16 | 20 | 10 | 13 | 12 |

VA - Vinyl acetate
VC - Vinyl chloride
Regd. Trade Mark

I claim:

1. An ester of the general formula

XR wherein X represents the group

R₁—O—(R₂)ₓ—O—(R₃)ᵧ—O—CO— in which $R_1$ is a $C_1$–$C_4$ alkyl group, each of $R_2$ and $R_3$ represent the same or different straight or branched chain alkylene group, and each of x and y represent an integer from 2 to 4, and R is selected from an ethyl group, a propyl group, X, and —$C_nH_{2n}$X wherein n is an integer between 1 and 8, and in each of which X has the same notation as above.

2. An ester according to claim 1 wherein said ester is derived from an alkyl diglycol ether and a carboxylic acid.

3. An ester according to claim 2 wherein the carboxylic acid used to produce the ester is selected from one or more of an aliphatic, alicyclic and an aromatic mono- or dicarboxylic acid and functionally substituted derivatives thereof.

4. An ester according to claim 1 wherein the ester is selected from the monoesters and diesters of
  (a) Diethylene glycol-monomethylether, diethylene glycol-monoethylether, diethylene glycol-mono n-propylether, diethylene glycol-mono-iso-propyl ether, diethylene glycol-mono n-butylether, diethylene glycol-mono-iso-butyl ether and diethylene glycol-mono-tertiary butylether;
  (b) Dipropylene glycol-monomethyl ether, dipropylene glycol-monoethylether, dipropylene glycol-mono n-propylether, dipropylene glycol-mono-iso-propyl ether, dipropylene glycol-mono n-butyl ether, dipropylene glycol-mono-iso-butyl ether and dipropylene glycol-mono-tertiary butyl ether;
  (c) Dibutylene glycol-monomethyl ether, dibutylene glycol-monoethylether, dibutylene glycol-mono n-propylether, dibutylene glycol-mono-iso-propyl ether, dibutylene glycol-mono n-butyl ether, dibutylene glycol-mono-iso-butyl ether and dibutylene glycol-mono-tertiary butyl ether; and
  (d) Butoxyethoxy propanol.

5. An ester according to claim 4 wherein the monoesters are selected from propionates, n-butyrates and isobutyrates and the diesters are selected from oxalates, malonates and succinates.

6. Ethyldiglycol propionate.

7. A paint formulation comprising as coalescing agent an ester claimed in claim 1.

8. A paint formulation as claimed in claim 7 wherein said formulation is an emulsion comprising a polymer latex and wherein the coalescing agent is present in an amount from 0.5 to 10% w/w of the emulsion.

9. An ester according to claim 1, wherein said ester is selected from the group consisting of a monoester and a diester derived from
  an alkyl diglycol ether selected from the group consisting of diethylene glycol-monomethylether, diethylene glycolmonoethylether, diethylene glycol-mono n-propylether, diethylene glycol-mono-iso-propyl ether, diethylene glycol-mono n-butylether, diethylene glycol-mono-iso-butyl ether and diethylene glycol-mono-tertiary butylether; and
  a carboxylic acid selected from the group consisting of a monocarboxylic acid selected from the group consisting of propionic acid, n-butyric acid and isobutyric acid and a dicarboxylic acid selected from the group consisting of oxalic acid, malonic acid and succinic acid.

10. An ester according to claim 9, wherein said ester is a monoester, and said carboxylic acid is a monocarboxylic acid selected from the group consisting of propionic acid, n-butyric acid and isobutyric acid.

11. An ester according to claim 9, wherein said ester is a diester, and said carboxylic acid is a dicarboxylic acid selected from the group consisting of oxalic acid, malonic acid and succinic acid.

12. An ester according to claim 1, wherein said ester is selected from the group consisting of a monoester and a diester derived from
  an alkyl diglycol ether selected from the group consisting of dipropylene glycol-monomethyl ether, dipropylene glycol-monoethylether, dipropylene glycol-mono n-propylether, dipropylene glycol-mono-iso-propyl ether, dipropylene glycolmono n-butyl ether, dipropylene glycol-mono-iso-butyl ether and dipropylene glycol-mono-tertiary butyl ether; and
  a carboxylic acid selected from the group consisting of a monocarboxylic acid selected from the group consisting of propionic acid, n-butyric acid and isobutyric acid and a dicarboxylic acid selected from the group consisting of oxalic acid, malonic acid and succinic acid.

13. An ester according to claim 12, wherein said ester is a monoester, and said carboxylic acid is a monocarboxylic acid selected from the group consisting of propionic acid, n-butyric acid and isobutyric acid.

14. An ester according to claim 12, wherein said ester is a diester, and said carboxylic acid is a dicarboxylic acid selected from the group consisting of oxalic acid, malonic acid and succinic acid.

15. An ester according to claim 1, wherein said ester is selected from the group consisting of a monoester and a diester derived from
  an alkyl diglycol ether selected from the group consisting of dibutylene glycol-monomethyl ether, dibutylene glycol-monoethylether, dibutylene glycol-mono n-propylether, dibutylene glycol-mono-iso-propyl ether, dibutylene glycol-mono n-butyl ether, dibutylene glycol-mono-iso-butyl ether and dibutylene glycol-mono-tertiary butyl ether; and
  a carboxylic acid selected from the group consisting of a monocarboxylic acid selected from the group consisting of propionic acid, n-butyric acid and isobutyric acid and a dicarboxylic acid selected from the group consisting of oxalic acid, malonic acid and succinic acid.

16. An ester according to claim 15, wherein said ester is a monoester, and said carboxylic acid is a monocarboxylic acid selected from the group consisting of propionic acid, n-butyric acid and isobutyric acid.

17. An ester according to claim 15, wherein said ester is a diester, and said carboxylic acid is a dicarboxylic acid selected from the group consisting of oxalic acid, malonic acid and succinic acid.

18. An ester according to claim 1, wherein said ester is selected from the group consisting of a monoester and diester derived from butoxyethoxy propanol; and
  a carboxylic acid selected from the group consisting of a monocarboxylic acid selected from the group consisting of propionic acid, n-butyric acid and isobutyric acid and a dicarboxylic acid selected from the group consisting of oxalic acid, malonic acid and succinic acid.

19. An ester according to claim 18, wherein said ester is a monoester, and said carboxylic acid is a mono-carboxylic acid selected from the group consisting of propionic acid, n-butyric acid and isobutyric acid.

20. An ester according to claim 18, wherein said ester is a diester, and said carboxylic acid is a dicarboxylic acid selected from the group consisting of oxalic acid, malonic acid and succinic acid.

* * * * *